(12) United States Patent
Fahrendorff et al.

(10) Patent No.: US 12,020,594 B2
(45) Date of Patent: Jun. 25, 2024

(54) METHODS OF GAMIFICATION FOR UNIFIED COLLABORATION AND PROJECT MANAGEMENT

(71) Applicant: Mitel Networks (International) Limited, London (GB)

(72) Inventors: Anders Fahrendorff, Ottawa (CA); Mona Abou-Sayed, Frisco, TX (US); Logendra Naidoo, Ottawa (CA)

(73) Assignee: MITEL NETWORKS CORPORATION, Kanata (CA)

( * ) Notice: Subject to any disclaimer, the term of this patent is extended or adjusted under 35 U.S.C. 154(b) by 976 days.

(21) Appl. No.: 17/001,556

(22) Filed: Aug. 24, 2020

(65) Prior Publication Data

US 2021/0056860 A1   Feb. 25, 2021

Related U.S. Application Data

(60) Provisional application No. 62/922,710, filed on Aug. 23, 2019.

(51) Int. Cl.
    *G09B 9/00*     (2006.01)
    *G09B 7/077*    (2006.01)
    (Continued)

(52) U.S. Cl.
    CPC .......... *G09B 7/077* (2013.01); *H04L 12/1831* (2013.01); *G10L 15/26* (2013.01)

(58) Field of Classification Search
    CPC . G09B 9/00; G09B 19/00; A63F 13/60; A63F 13/65
    See application file for complete search history.

(56) References Cited

U.S. PATENT DOCUMENTS

| 10,960,312 | B2 * | 3/2021 | Musuluri | ............... | A63F 13/63 |
| 2013/0079128 | A1 * | 3/2013 | Thomas | ............... | A63F 13/35 |
| | | | | | 463/30 |

(Continued)

FOREIGN PATENT DOCUMENTS

WO    WO-2014022668 A1 *   2/2014   ............. A63F 9/183

OTHER PUBLICATIONS

Drexel, "Gamified Artificial Intelligence and Predictive Analytics . . . ", Website https://virtuallyinspried.org/portfolio/quitch; Copyright 2020.

(Continued)

*Primary Examiner* — Kurt Fernstrom

(57) ABSTRACT

Systems and methods for of automated gamification are disclosed. An example method of automated gamification is disclosed. The method includes transcribing content of a proceeding. The method includes determining one or more keywords from the content transcribed, the one or more keywords indicating a topic of the proceeding. Additionally, the method includes generating a game for the proceeding based on the one or more keywords using Natural Language Processing (NLP). The method also includes presenting the game for the proceeding to at least one participant of the proceeding and receiving a response to the game from the at least one participant of the proceeding. Additionally, the method includes allowing the at least one participant of the proceeding to move to a next objective, based on evaluating the response received based on an established criterion.

20 Claims, 6 Drawing Sheets

(51) Int. Cl.
*H04L 12/18* (2006.01)
*G10L 15/26* (2006.01)

(56) References Cited

U.S. PATENT DOCUMENTS

| | | | | |
|---|---|---|---|---|
| 2014/0051501 | A1* | 2/2014 | Boyles | A63F 13/798 |
| | | | | 463/25 |
| 2014/0335955 | A1* | 11/2014 | Thomas | A63F 13/792 |
| | | | | 463/31 |
| 2015/0375119 | A1* | 12/2015 | Musuluri | G06F 16/951 |
| | | | | 463/29 |
| 2016/0082348 | A1* | 3/2016 | Kehoe | G06Q 10/101 |
| | | | | 463/31 |
| 2017/0296919 | A1* | 10/2017 | Margiotta | A63F 13/46 |
| 2018/0036639 | A1* | 2/2018 | Reid | A63F 13/52 |
| 2019/0346981 | A1* | 11/2019 | Pasala | G06F 8/33 |
| 2020/0222801 | A1* | 7/2020 | Agrawal | A63F 13/795 |

OTHER PUBLICATIONS

Hiner, Jason, "AI Breakthrough: Otter.ai app can transcribe your meetings in real time, for free"; Website www.zdnet.com; Mar. 2, 2018.

* cited by examiner

METHODS OF GAMIFICATION FOR UNIFIED COLLABORATION AND PROJECT MANAGEMENT

CROSS-REFERENCE TO RELATED APPLICATION

This application claims the benefit of U.S. Provisional Application No. 62/922,710, filed Aug. 23, 2019, and entitled METHODS FOR COLLABORATING AND COMMUNICATING IN MEETING ENVIRONMENTS, the contents of which are hereby incorporated herein by reference, to the extent such contents do not conflict with the present disclosure. U.S. patent application Ser. No. 16/013,703, filed Jun. 20, 2018, and entitled SYSTEM AND METHOD FOR RECORDING AND REVIEWING MIXED-MEDIA COMMUNICATIONS and U.S. patent application Ser. No. 16/216,721, filed Jun. 20, 2018, and entitled ELECTRONIC COMMUNICATION SYSTEM WITH DRAFTING ASSISTANT AND METHOD OF USING SAME are hereby incorporated herein by reference, to the extent such contents do not conflict with the present disclosure.

FIELD OF THE INVENTION

The present disclosure generally relates to electronic communication methods and systems to facilitate meeting or proceeding participation and participant retention. More particularly, examples of the disclosure relate to meeting or proceeding-related electronic systems, methods, and tools for automated gamification of content resulting from a proceeding such as a meeting or classroom setting.

BACKGROUND OF THE DISCLOSURE

In various meetings, including virtual collaboration sessions, it is preferable to increase engagement of the meeting participants. It is also generally preferable to increase participation level of the attendees and for the meeting host to have a meaningful impact on the participants. Unfortunately, it is fairly common that after a meeting, the host may receive follow-up questions about things that the host may have already explained during the meeting. Inattentiveness during the meeting may be the cause of missed information.

During live meetings, a common problem is a lack of participation or employee engagement. Similarly, during classroom sessions, students may also run into issues with being able to remember the course's subject matter. However, if meeting attendees (or students) do not review the agenda (or syllabus) or related materials ahead of a meeting, or pay attention during the meeting, the lack of attentiveness may result in a missed opportunity to optimizing the learning experience. Remembering the valuable discussion that transpires during a collaboration event for each agenda item is the goal of a successful meeting. Remembering the valuable discussion better prepares the participants to work on their respective plans, understand the bigger picture, and ensure the timely closure of any actions. The importance of knowledge-retention is what drives facilitators to aspire to hold effective meetings (and for teachers or professors to teach effectively as well). Ineffective meetings lead to time wasters for the attendees and at worst, may result in poor decisions that negatively impact business performance (or student's final grades).

When organizations moved from audio-conferencing to video calls like MiTeam or Zoom video calls, studies indicated that most of the participants were performing other tasks on their mobile phones and were not even looking at the shared screens.

Common challenges of virtual live meetings include distractions, technical difficulties, and recorded sessions. Distractions may include emails or surf the web. It may be especially enticing to answer emails or surf the web during a virtual live or online meeting. The period of attention to web-based activities or important discussions over the live conference is particularly short. Technical difficulties may include poor connections, noisy loudspeakers, echoes from participants leaving their microphones while using loudspeakers, a buffered video, or other technical problems. Technical barriers to online meetings are practical obstacles. Recording a session may make it easier for attendees to multi-task, learn passively, or not watch the sessions at all.

According to a recent BlueJeans survey of 700 professionals in the United States, including managers and individual contributors, 67% stated that meetings are on the rise and that ⅓ of weekly meetings are a waste of time. Meeting and business productivity experts concluded that unproductive meetings can be incredibly expensive for any size of an organization. For example, meeting waste costs the U.S. economy more than $400 billion per year. Meeting waste may be particularly high when critical information and responsibilities derived from those meetings are not captured, tracked, and managed well. Ninety-one percent of business professionals admitted to daydreaming in meetings and 39% admitted to falling asleep at some point. Optimal audience engagement focuses on keeping your participants interested to the point that they are motivated to complete an action, even if it means that the action is to increase the connection between facilitator and participant. Accordingly, improved methods and systems for engaging meeting participants (or students) are advantageous.

SUMMARY

An example method of automated gamification is disclosed. The method includes transcribing content of a proceeding. The method includes determining one or more keywords from the content transcribed, the one or more keywords indicating a topic of the proceeding. Additionally, the method includes generating a game for the proceeding based on the one or more keywords using Natural Language Processing (NLP). The method also includes presenting the game for the proceeding to at least one participant of the proceeding and receiving a response to the game from the at least one participant of the proceeding. Additionally, the method includes allowing the at least one participant of the proceeding to move to a next objective, based on evaluating the response received based on an established criterion.

An apparatus for automated gamification is disclosed. The apparatus includes at least one processor and a memory. The memory is coupled to the at least one processor. The memory including instructions causing the processor to transcribe content of a proceeding. The memory including instructions causing the processor to determine one or more keywords from the content transcribed, the one or more keywords indicating a topic of the proceeding. Additionally, the memory including instructions causing the processor to generate a game for the proceeding based on the one or more keywords using NLP. The memory also including instructions causing the processor to present the game for the proceeding to at least one participant of the proceeding. Additionally, the memory including instructions causing the processor to receive a response to the game from the at least one participant of the proceeding. The memory also including instructions causing the processor to allow the at least one participant of the proceeding to move to a next objective, based on evaluating the response received based on an established criterion.

A system for automated gamification is disclosed. The system includes a first communication device and a second communication device. The first communication device and the second communication device are in communication for a virtual proceeding. At least one of the first communication device and the second communication device configured to transcribe content of a proceeding, determine one or more keywords from the content transcribed, the one or more keywords indicating a topic of the proceeding, generate a game for the proceeding based on the one or more keywords using NLP, present the game for the proceeding to at least one participant of the proceeding, receive a response to the game from the at least one participant of the proceeding, and allow the at least one participant of the proceeding to move to a next objective, based on evaluating the response received based on an established criterion.

BRIEF DESCRIPTION OF THE DRAWING FIGURES

Subject matter of the present disclosure is particularly pointed out and distinctly claimed in the concluding portion of the specification. A more complete understanding of the present disclosure, however, may best be obtained by referring to the detailed description and claims when considered in connection with the drawing figures.

Figure 1:
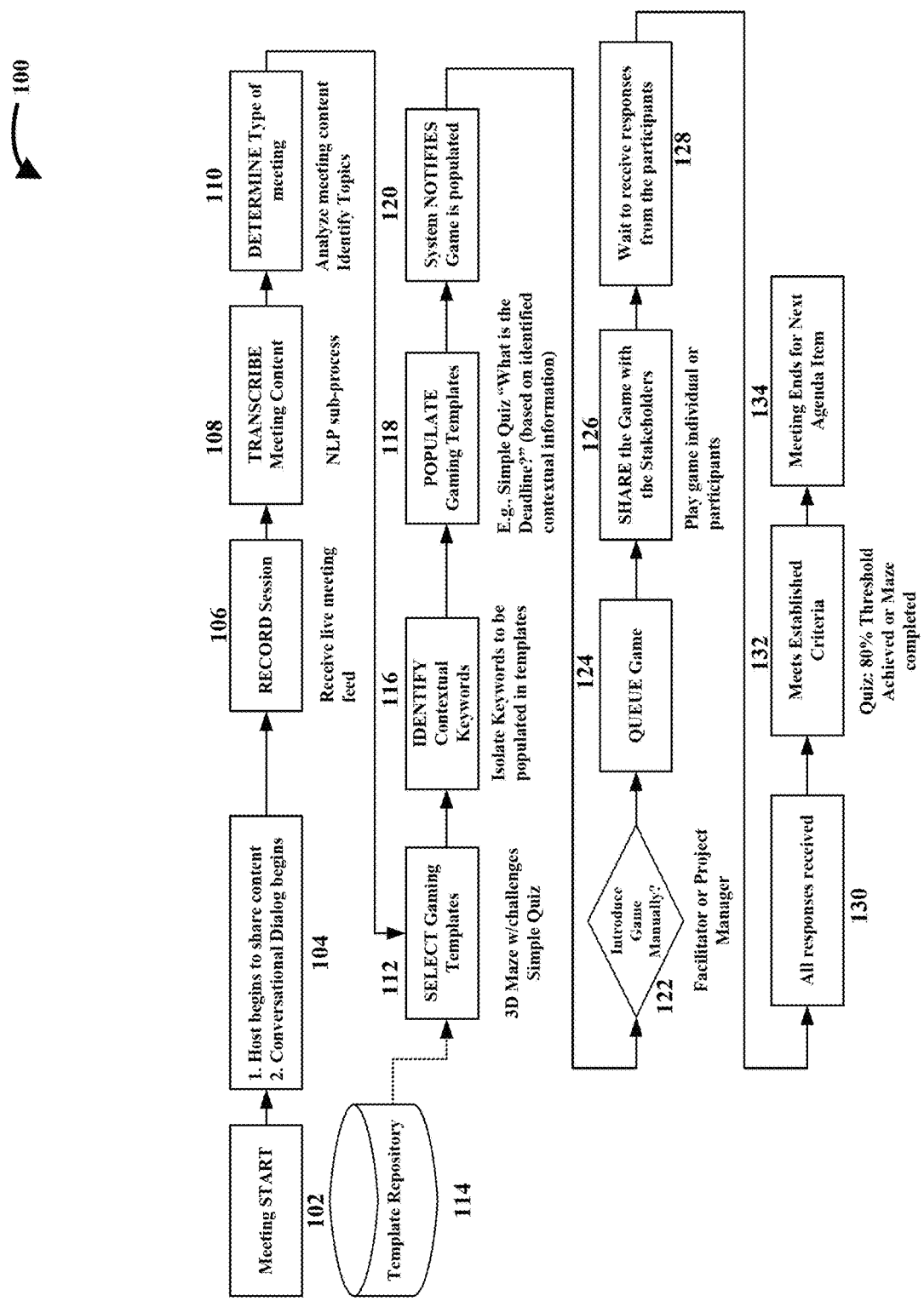
FIG. 1 illustrates an example gaming method in accordance with various exemplary embodiments of the disclosure.

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present invention.

DETAILED DESCRIPTION

The description of various embodiments of the present disclosure provided below is merely exemplary and is intended for purposes of illustration only; the following description is not intended to limit the scope of an invention disclosed herein. Moreover, recitation of multiple embodiments having stated features is not intended to exclude other embodiments having additional features or other embodiments incorporating different combinations of the stated features.

After an online meeting, a facilitator may send a message or email to each participant and get feedback. Such a process may be very time consuming and only measures how many people took part in the polls, not their understanding of the subject matter. Previous solutions, such as holding a meeting and hoping everyone remembers everything, have led to business organizations being hampered in successfully keeping their employees' from concentrating on a topic before becoming distracted. The drawback of reworking in the form of repetitive follow-up questions after each meeting is also common.

There is a need for a system to be less focused on "how did I do?" versus testing the audience for knowledge-transfer. Executing an optimized follow-up reeducation method focused on the student to reflecting his or her ability to retain knowledge. When trying to get your points across in a meeting, the stakeholder often only gets one shot. Plus, if you lose your audience, you may not get them back. If you get a second shot it may be the result of rework and added expense.

Usually, meetings are sponsored within management structures to achieve some sort of goal or agenda. When those goals aren't met, it can lead to productivity issues as employees are less informed and unaware of how to perform effectively (e.g., communicate, develop, or other effective performance). One example solution is a method comprising of gamification driven functions to verify, ensure and possibly improve the engagement of participants purposefully implanted in meeting settings.

Example One

A game-like structure in the proposed solution prevents participants from moving to the next agenda item until a team or individual goal is achieved. Such rules are applied to make the preceding discussion memorable.

Example Two

If a dispute unfolds, the system is able to offer a game to resolve the dispute likely leveraging certain facts learned from any preceding discussions. The system can either propose a game that is not related to the subject matter (i.e., an alternate approach to a random outcome; like ask the 8-ball) vs. a system that include a logic-tree model that tests two competing theories using logic tree nodes populated with word-elements.

Example Three

At the end of the meeting, the facilitator pushes games to stakeholders that include elements derived from the conversations during the meeting or from presented content (e.g., in written form). "What is the GA date?," "Who is the SVE prime for project X?," "Critical path items for project X include?" An example may show a game such as a quiz, or, a more immersive game may be introduced towards the end of the meeting or after a meeting that challenges participants using made-up teams to move through a 3D maze and at each junction a door opens when a challenge question is correct. A game may be presented using a "huddle" screen online so only each team sees the gameplay.

No known implementation exists for providing a gamification function during meetings or educational proceedings, or other proceedings (such as in a classroom or during an online course). An example method may include one or more of the following steps. An NLP module may be used to convert machine-readable content to a readable content. The NLP module may generate real-time data from an online meeting (or other proceeding). The NLP module may also include a transcription of an ongoing discussion, goals of the discussion, project deadlines, structural steps of project's completion, or other relevant information on the project discussed. An example embodiment may include an observable or analyzing module to determine important content (e.g., transcription; keyword detection; topic detection, or other important content) and provide context awareness of the meeting. An example embodiment may include a gamification function module to provide Automatically building a game structure based on discussion transcription Interactive interface for all participants Introducing the game object into an ongoing meeting after one discussion/topic is completed. The systems and methods described herein are generally described with respect to meetings. It will be understood that these systems and methods may be applied to various other proceedings, such as educational proceedings including online classes and in a classroom setting.

An example embodiment emphasizes knowledge retention of the meeting participants during the live meeting and afterwards. The example embodiment may extract key content that may be material to the collaboration session using standard NLP. The example embodiment may then assemble the learned terms in a gaming construct to verify the key facts are properly retained. Furthermore, the example embodiment may offer an autonomous approach to eliminate overhead on the part of the facilitator or project manager to be burdened with micro-managing the explicit knowledge demands of a project, for example. The key differentiator of standard quiz generators is that the proposed embodiments analyze the proceedings first, then proposes a game that the proposed embodiments tailor for a particular outcome or goal.

An example embodiment may analyze the conversations that transpire during meetings. The example embodiment may extract explicit knowledge in the form of key facts either from transcribed conversations or written form such as documents. The example embodiment may perform topic identification. Topic identification may be a way to leverage key terms and identify a more generalized category of semantic purpose. The example embodiment may cue meeting participants that a game is being prepared based on preceding conversations, presentations, other meeting components, or some combination of conversations, presentations, other meeting components.

An example embodiment may select a gaming-template that ensures optimal engagement (an adjustable estimated game duration can be specified beforehand by PM that takes into account time left in meeting, for example. The example embodiment may use a template. In an example, the template may be a simple pop-quiz, or the template may be more comprehensive and interactive such as solving clues to overcome challenges in a first-person type game such as a virtual labyrinth.

An example embodiment may use other gaming templates that may be based on various types of meetings such as: webinars, tutorials, discussion, brainstorming, goals, challenges, or other types of meetings. A library of gaming constructs for a specific purpose designed in advance may also be helpful if, for example, the meeting is related to the earlier detected topic. Therefore, a game that is specially designed for such topics may be wielded for a training purpose (e.g., "Your Scrum Master for Project X is?;" "Your scrum team has 5-members. Who are they (list each person and their role);" or other games.)

An example embodiment may, during the live meeting, use the gamification function. For example, the gamification function can also be applied (e.g., after one topic ends) to verify the knowledge retentions of the stakeholders regarding presented or discussed material. As an example, when attendees are talking related to a project in a video conference, if asked about the status of the project during discussion, then related information such as "project feedback," "deadline," "updates," "follow-ups," are determined by the system. The system may focus on these transcribed keywords as they are already present in gaming templates and send the related information to the gaming function module.

An example embodiment may include statistical approaches to counting the most common words or phrases used in a meeting that may lead to the gamification of such content.

In an example embodiment, the gamification function may include games, but they might not be limited to quizzes, word games, challenge-phrase related to the topic of discussion to keep the participants excited and more engaged in the meeting.

Globally, the gamification market is strong. The global game-based learning market was worth around $2.4 billion U.S. in 2018. As of 2018, video games alone generated sales of $134.9 billion U.S. annually worldwide. There exists an aptitude for gaming concepts to be adopted by collaboration-professionals based on market analytics. Therefore, gaming concepts are primed to be much more effectively introduced to productivity-driven collaboration sessions to essentially make meetings much more fun and efficient.

An example embodiment may use unassigned meeting actions and tasks that are determined based on the outcome of quick games between participants. An example embodiment may use actions that are not completed on time to generate a result that may be applied to the game, such as "You get one less clue in 'Action Dodger 3D Maze.'" An example embodiment may include the idea of using a gaming strategy to solve problems. Such an example may also be interesting because it may cause the participants to engage in such gaming concepts.

In an example, facilitators may also be given the option to accept the system's gamified meeting content or insert the facilitator's own challenge-content (e.g., queries, keywords, or other content). The facilitator's own challenge-content may be a partial acceptance of some of the challenge-content derived from the meeting or may replace the generated content with content that emphasizes what the facilitator wants.

The scope of various embodiments is not limited to live meetings in companies. The scope may be used in any online or offline discussion application platform. For example, during online classes, the system may provide a quiz to verify the attention of the students in the class. The quiz questions may be derived from the live discussion and the rules of the game may not allow the teacher to move on to the next topic until the desired outcome from the game is achieved by the whole class.

Gamification used in collaboration settings implies a professional utility can be used to make mundane topics more enjoyable through the increased participation of individuals to learn through play. An example embodiment may instill a gamification-based function in a meeting-apparatus. As a result, the example embodiment may empower collaborators to "come out of their shell" and meet certain goals that also serve to reinforce the subject matter of the previous proceedings or solve a dilemma during the proceedings.

Gamification functions that are introduced during the meeting may take the form of a quiz, word-phrases, or other games. The games may include different media events or content, derived from the live discussion (e.g., using NLP technology). The games can also be much more graphically demanding for better effect to enhance interactivity; however, the goals of the games are very similar, e.g., to ensure participants remember meeting materials.

Each collaboration participant is engaged using available conference-enabling devices. The devices, such as display devices, operate in conjunction with one or more gamification applications. The method proposed relies heavily on the detection of game-elements through the conferencing devices, which are not necessarily the typical collaboration-related datapoints. For example, unresolved debates might be recorded in minutes or transcribed, however the methods do not propose reconciliation of confrontational discussions through an analysis of the language-elements. Systems are capable of detecting sentiment, actionable-phrases, and even keywords e.g., "We might need to gamify this one to resolve it." Executive decisions sometimes leave the decision-makers in a bind, when it would be desirable for the participants to "Work it out amongst yourselves." The game may allow outcomes that are material (i.e., important enough) to be facilitated through gamification and enhance the collaboration using a schema that is consistent with the crux of a dispute (e.g., to move to the next clue, please list 3-pros of your outsourcing idea. [60-seconds]."

Each collaboration device may be monitored to purposefully record, analyze, then track the in-depth meeting contexts. The system may be equipped with software that is capable of recording and evaluating the context of the meeting. The context may pertain to a business context in which there is a desire to motivate and inspire employees to learn the subject matter and meet project goals. The context may also pertain to situations where minor conflict arises, and a dispute is best resolved than shelved.

The meeting apparatus can be any traditional meeting service running in the cloud or on-premise based, however the analysis of the meeting output may be performed through the use of a server. The server may be running in a cloud service. The server's purpose is to analyze speech output and resolve the game elements.

The cloud architecture may allow users from multiple locations to be monitored by the analysis service in a distributed framework. When the meeting is initiated, the system first produces a recording that leads to a cached transcript for the purposes of natural language processing. Once the system produces meeting output for further analysis, the emphasis may then be on identifying certain useful facts that represent what was discussed in the event. This may include the main topic under discussion, which is a keyword or a phrase that is common to the discussion across multiple participants (e.g., "risk"+"product launch"), numerous sub-topics that may be identified through the presentation of scripted agenda-items (sent in advance of the meeting) or through the analysis of the words spoken leading to the identification of other topics that pose commonality across one or more participants. For example, if no agenda-item is proposed for a discussion surrounding "hiring a software testing firm," then the system may independently propose a sub-topic such as "software testing company." The additional keywords that would be analyzed would be supporting this topic such as "budget cap," "under ten-thousand," "by December 1," or other similar keywords. All such keywords may be grouped according to each category for the purpose of forming a game element.

During the meeting, online or otherwise, there are various sources of context. The context may be used to populate the gaming templates with the relevant keywords that are ideally suited to allow the gaming engine to craft, create, or customize a game based on what may be helpful. Creating a quiz about the wrong topics will diminish the utility of the systems and methods described herein. If the game challenges the players (e.g., meeting participants) about the right topics, (the right "take-aways," or agenda items) then the game may contest the facts that are optimized to verify the participants learned the desired outcomes of the meeting. Therefore, the system may use NLP parsing to transcribe the live feed discussions which further determine the contextual words.

If the agenda item is "Status" and the participants speak about their status, then the system (1) may perform NLP and (2) associate the analyzed keywords with the agenda item, and use these facts that should have been learned by the meeting stakeholders as the basis of most relevant gameplay. Alternatively, participants may gain scores by completing tasks specified by the system. The system could show the real-time score of the participant or team to create healthy competition. Special jobs and responsibilities may be assigned to be awarded to participants as they achieve certain goals and accomplishments. Social media boards at work may be displayed, such as "All Time Leaderboard."

In an example embodiment, a system may start recording of the meeting. The system may receive the live feed of the meeting and transcribing the content of the meeting. The system may determine the type of a meeting by either finding action words in the transcribed content such as: "status," "brainstorming session," "tutorial," "follow up," "objective of the meeting" or likewise, contextual learning using state of the art NLP technique on the transcribed content which indicate the purpose of the meeting (or proceeding), or the host can voluntarily mention the agenda of the meeting upfront.

The system may select a gaming template from a database, containing pre-defined gaming templates, based on the determined type of the meeting. For example, the system may find keywords or contextual learning using the state of the art NLP technique in the transcribed content which is required to populate specific fields of the selected gaming template such as "deadline," "date," "feedback request," "timelines," "targets," or likewise which indicates important aspects of the meeting which is essential for the participants to understand and remember. Populating the selected gaming template may be based on the learned context of the topic which is essential for the participants to understand and remember. For example, if the system has learned the context of the topic as "Deadline of the project is in August 2020" from the transcription, then the predefined query in the gaming template would be, for example, "What is the deadline of the project?"

An example embodiment may notify the host that the gaming template is prepared and is ready to be shared with the participants. Share the populated game template with the participants. Evaluate the replies based on the replies received from all the participants. Evaluate the replies of all participants based on a predefined threshold level. Meet ends or move to the next agenda based on the evaluation of the replies received from all participants.

Furthermore, the rules or concepts in the gamification method prevent the host from progressing to the next item on the agenda until the participants achieve a desired outcome. The game results can also help the facilitator assign jobs and responsibilities to the higher scoring participant. The overall method proposed as follows:

FIG. 1 illustrates an example gaming method 100 in accordance with various exemplary embodiments of the disclosure. The method 100 of FIG. 1 provides an introduction of gamification function in live meeting (or proceeding). The meeting starts 102. The host begins to share content and conversational dialog begins 104. The session may be recorded 106. Additionally, the session may be transcribed 108. From the transcription, a meeting type may be determined 110. Based on the meeting type, a gaming template may be selected 112 from a template repository 114. Additionally, from the meeting template, contextual keywords may be identified 116. The keywords may be used to populate the gaming template 118. The system may notify the users that the game is populated 120. In an example, the game may be introduced manually 122, in some examples. The game may be cued 124 and shared with stakeholders 126, e.g., meeting participants, meeting hosts, or other meeting attendees. The system may wait to receive responses from one or more of meeting participants, meeting hosts, or other meeting attendees 128. A determination may be made that all the responses have been received 130. A criterion may be established 132. (This may occur prior to the meeting, during the meeting, during the game, or after the game during grading.) The game may be graded based on the criterion, e.g., 80% threshold. Based on meeting the criterion, the meeting may end or move to the next agenda item in a meeting 134.

Figure 2:
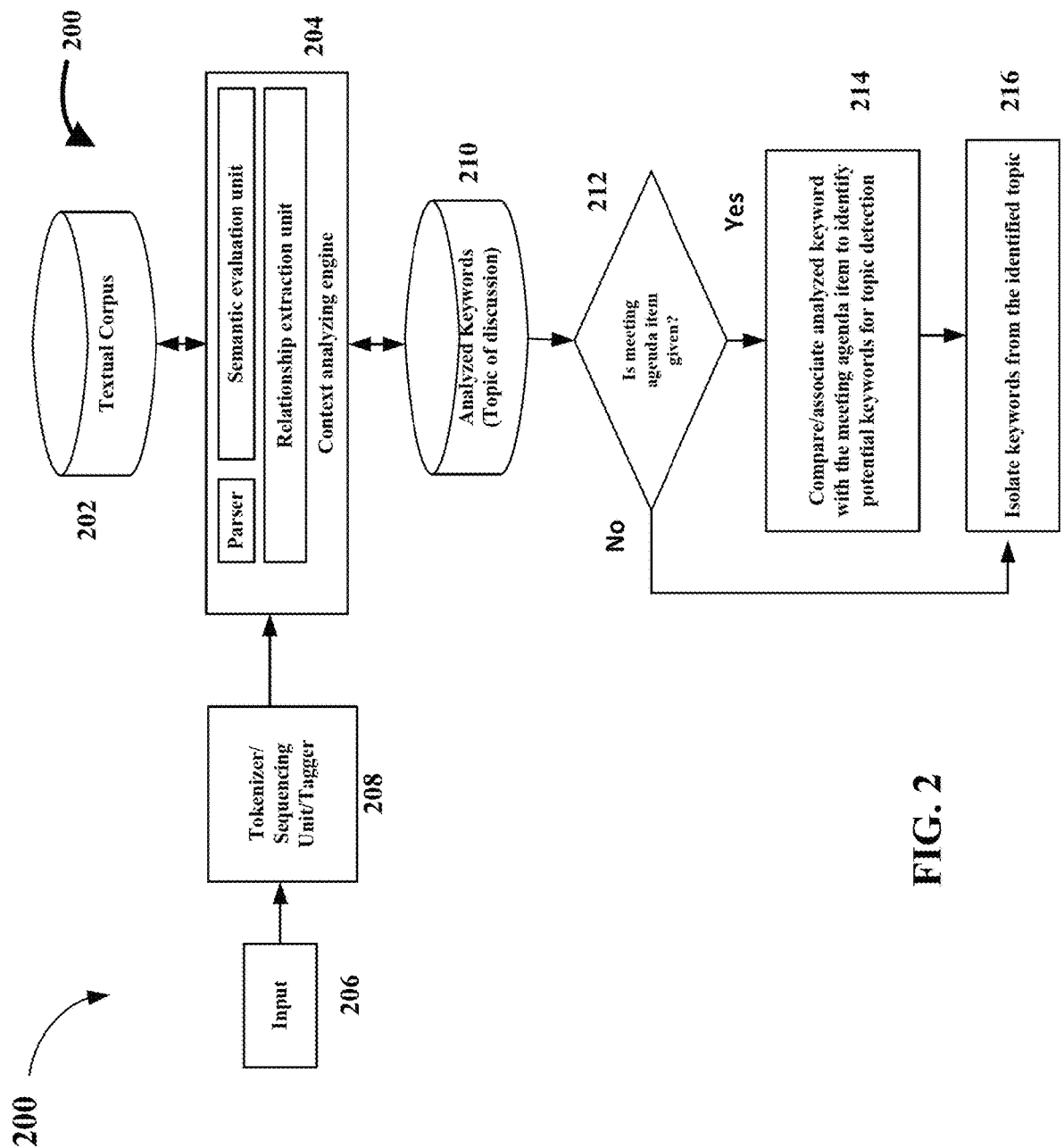
FIG. 2 illustrates another example gaming method in accordance with exemplary embodiments of the disclosure.

FIG. 2 illustrates another example gaming method 200 in accordance with exemplary embodiments of the disclosure. FIG. 2. illustrates an NLP technique to isolate facts concerning a meeting (or proceeding). The method 200 may begin with a database of the text of the meeting (or a portion of the meeting) 202. The text may be provided to a contextual analysis engine 204, which may include a parser, semantic evaluation unit, and relationship extraction unit. Accordingly, the contextual analysis engine may parse the text, semantic evaluation the parsed text, and determine relationships of the text. Other inputs 206 may be provided to the contextual analysis engine 204 through the tagger 208. An analyzer 210 may further process the text to determine a topic of the meeting or a portion of the meeting. When the agenda item is given 212 ("yes"), the system may compare or associate the analyzed keyword with the meeting agenda item to identify potential keywords for topic discussion 214. When the agenda item is not given 212 ("no"), keywords may be isolated from an identified topic in the transcribed text 216.

Figure 3:
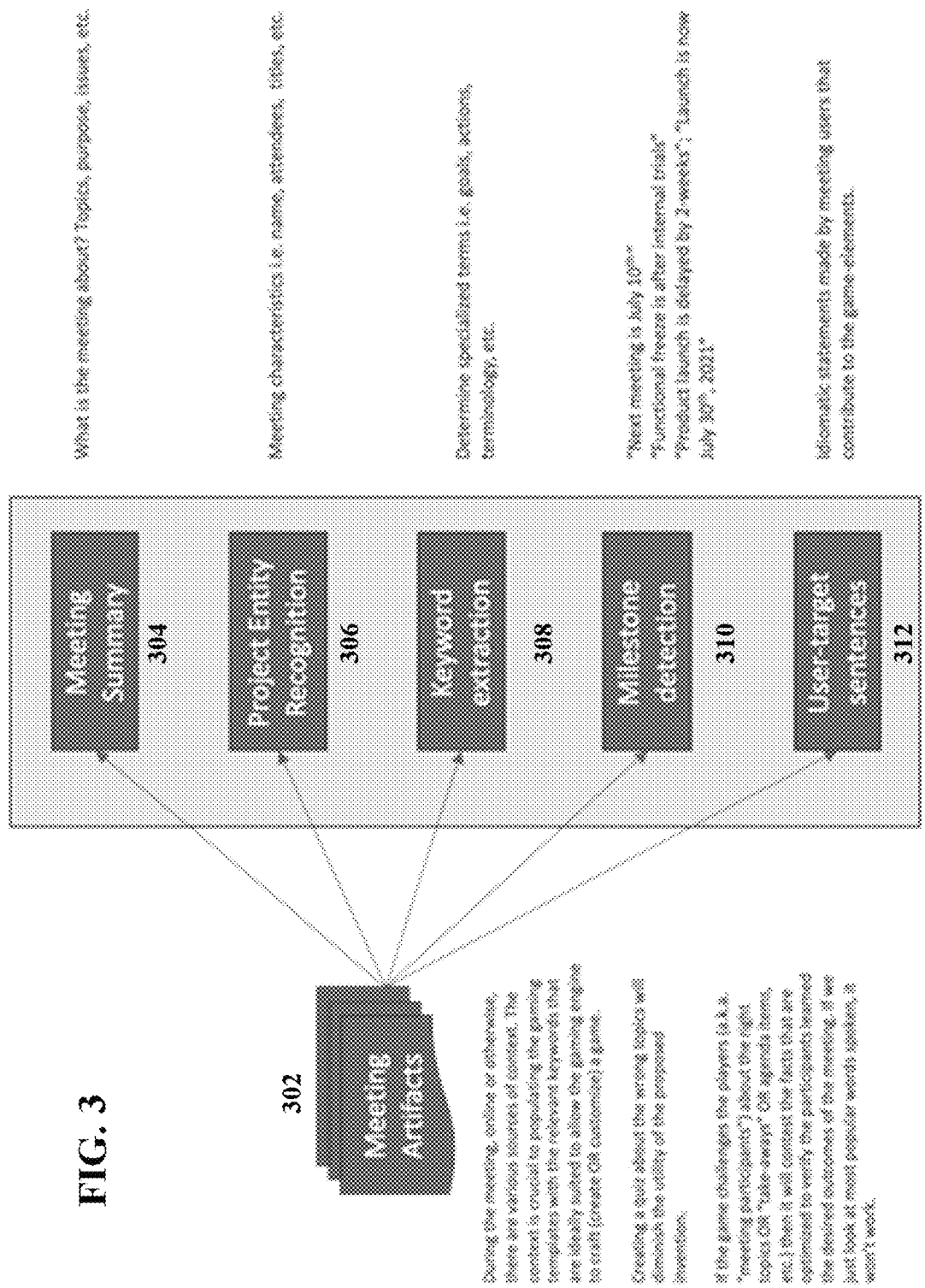
FIG. 3 illustrates an example context analyzer in accordance with exemplary embodiments of the disclosure.

FIG. 3 illustrates an example context analyzer 300 in accordance with exemplary embodiments of the disclosure. The context analyzer 300 may use meeting artifacts 302 to determine context. From the context, one or more of a meeting summary 304, project entity recognition 306, keyword extraction 308, milestone detection 310, or user-targeted sentences 312 may be determined. During the meeting, online or otherwise, there may be various sources of context. The context may be used to populating the gaming templates with the relevant keywords that are suited to allow the game engine to craft, create, or customize a game. Creating a quiz about the wrong topic may diminish the value of the proposed invention. If the game challenges the players about the right topic, takeaways, or agenda items, then the game may test the correct facts to verify the participants learned the desired outcomes of the meeting. If a system just looks at the most popular word spoken it may not work correctly. Rather, the transcribed text must be further analyzed as described herein.

A meeting summary may include what the topic of the meeting is, what the purpose and issues are, as well as other meeting information. A project entity recognition may provide meeting characteristics, such as meeting attendees (name), titles, or other attendees information. Keyword extraction may determine special terms, goals, actions, terminology, or other keyword information. The milestone detection may determine milestones such as future meeting dates (e.g., "July 10"), actions (e.g., "functional freeze is after trails"), product launch (e.g., "product launch is delayed by two weeks," "product launch is now," "product launch is Jul. 30, 2021") or other information. User-targeted sentences may be used to determined idiomatic statements made by meeting users that contribute to game-elements.

In an example, a gamification method in a virtual meeting may include auto-transcribing content of a virtual meeting. The method may also include selecting a gaming template from a database in response to determining context of the meeting using an NLP technique on the auto-transcribed content. Additionally, the method may include detecting a start of a topic, introduced by a host of the virtual meeting, in response to the auto-transcribing meeting content shared by the at least one participant. The method may also include determining keywords required to fill the selected gaming template. The method may include populating the keywords in the selected gaming template in response to either finding the keywords required to fill the selected gaming template in the auto-transcribed content of the meeting or the determined context of the meeting using the NLP technique on the auto-transcribed content. Additionally, the method may include generating a notification that the at least one gaming template is populated.

The method may include sharing the populated at least one gaming template with the participants of the virtual meeting, in response to receiving a request from the participant. Additionally, the method may include receiving responses of the populated at least one gaming template from all the participants. In an example, the method may include allowing the at least one participant to move to a next objective, in response to evaluating received responses meeting an established criterion. In an example embodiment, the method may include selecting the gaming template from the database in response to finding at least one keyword in the transcribed content indicating the purpose of the virtual meeting. In an example embodiment, selecting the gaming template from the database may be in response to receiving input from the host indicating the purpose of the meeting.

Figure 4:
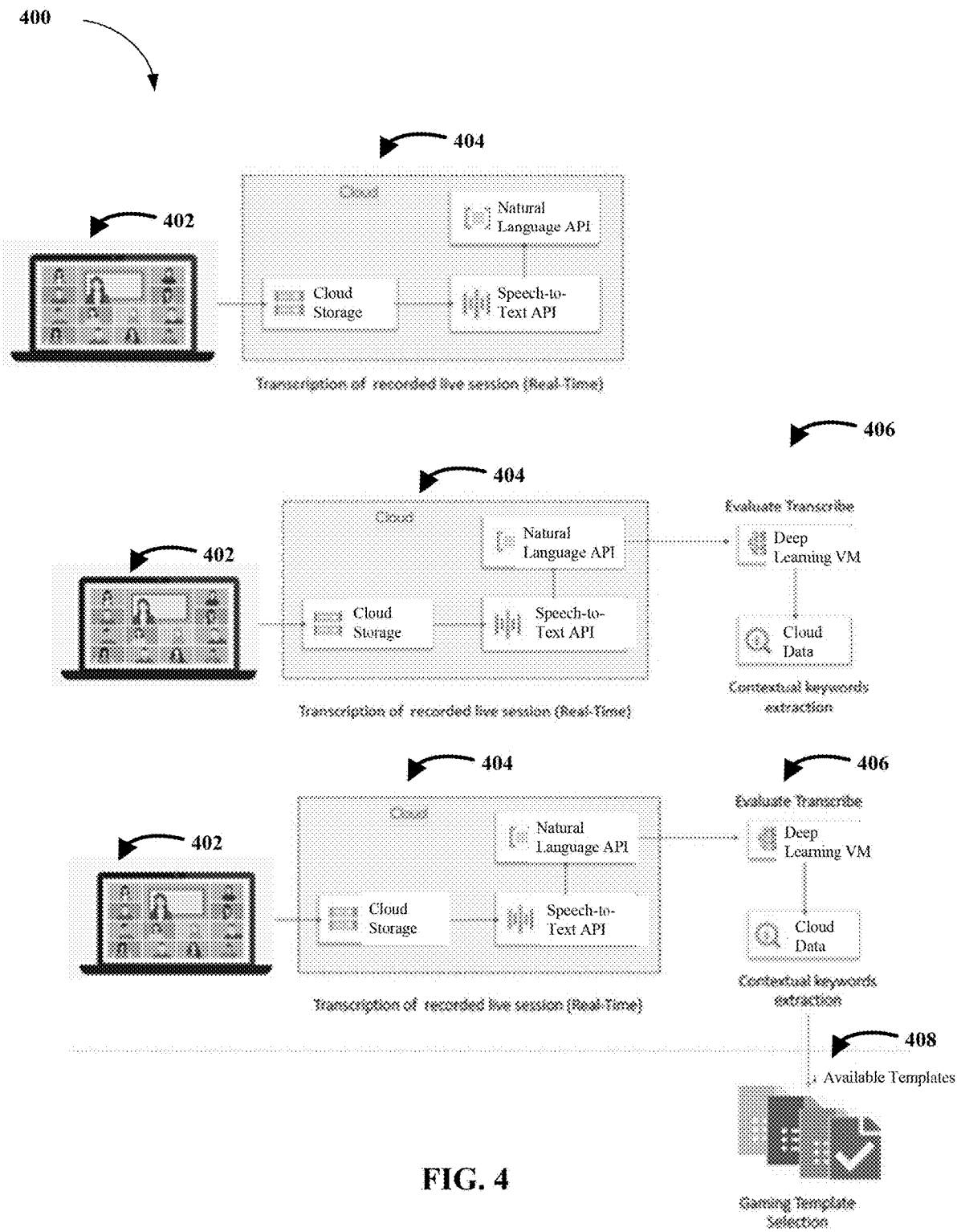
FIG. 4 illustrates an example system in accordance with exemplary embodiments of the disclosure.

FIG. 4 illustrates an example system 400 in accordance with exemplary embodiments of the disclosure. A computer 402 may connect to a cloud 404. The cloud 404 may include cloud-based storage, a speech-to-text block, and a natural language application programming interface (API). The meeting may be conducted, in part, over the computer 402. For example, one or more participants in a meeting may connect to the meeting using the computer 402. A recording of the meeting may be made or may be sent to the cloud storage. The meeting may be transcribed using the speech-to-text API. A natural language API may be used to further process the text generated. The transcription may be used in real-time or near real-time, e.g., with a slight delay for processing from the recording. The transcription may be evaluated and stored as cloud-data at 406. Additionally, the transcript may be applied to one or more gaming templates 408.

Example gamification templates may include a basic quiz template (NLP transcription derived). In a first step, by using NLP, for example, Google's Natural Language API, the proposed analysis method first transcribes and extracts linguistic elements from audio conversations. In a second step, the gamification engine receives the analysis results as the API processes the meeting output and applies the respective template that is appropriate for the collaboration event.

A context type model may be defined in the system already, which helps the system to select the appropriate template for the isolated keywords and populates the information in the template accordingly. For example, a simple staff meeting may warrant a simple quiz template based on fact that the subject matter is less technical or because the duration is shorter with fewer attendees for example. Whereas a sales strategy meeting with a formalized agenda and presentation of key metrics, strategies, direction from CEO, etc. may warrant a first-person maze challenge using multiple teams. It is possible in variations of the above method that the systems is capable of autonomously deciding which game-template is most appropriate for the audience. For example, age, and skillset might warrant different games. An 18-21 age group of students might be more engaged with a first-person "shooter" type of game where the targets in the game are right vs. wrong. A crowd that is highly skilled and/or includes mainly of a more mature audience could warrant a simpler 3D-maze type of game.

As mentioned, the system populates the game templates from selected relevant terms that are an essentially an element-based summary of the proceedings. It may include keywords or phrases that are returned by the NLP technique. The gamification template includes placeholders for the various in-game challenges that are based on the most relevant keywords extracted using NLP. The students are then required to play the generated game (infused with meeting facts, etc.) that acts as a rubric to provide a score used to evaluate the quality of the participant's (i.e., student or meeting attendee) constructed responses—again, through their gameplay while interacting with the challenges that establish how effective they were at remembering what was covered in the meeting or lecture, etc.

A query may be generated such as "who discovered the plant cell?," "what year was the plant cell first observed" after isolating the words discovered and cell or "what is the online examination date?," "what is the time of submission?," "what is the topic of discussion?" or other example questions.

The gamification template may include a series of questions created on the basis of the NLP technique. The template may include images for any quiz-question (where applicable; word=a pictogram). In games, an image could provide a pictorial resemblance to a word or phrase for cases such as a project with critical status, e.g., "the Nero project is critical (plus a critical indication symbol) or weather conditions, e.g., "we will cancel the tradeshow only if it rains." (plus a rain symbol)

Figure 5:
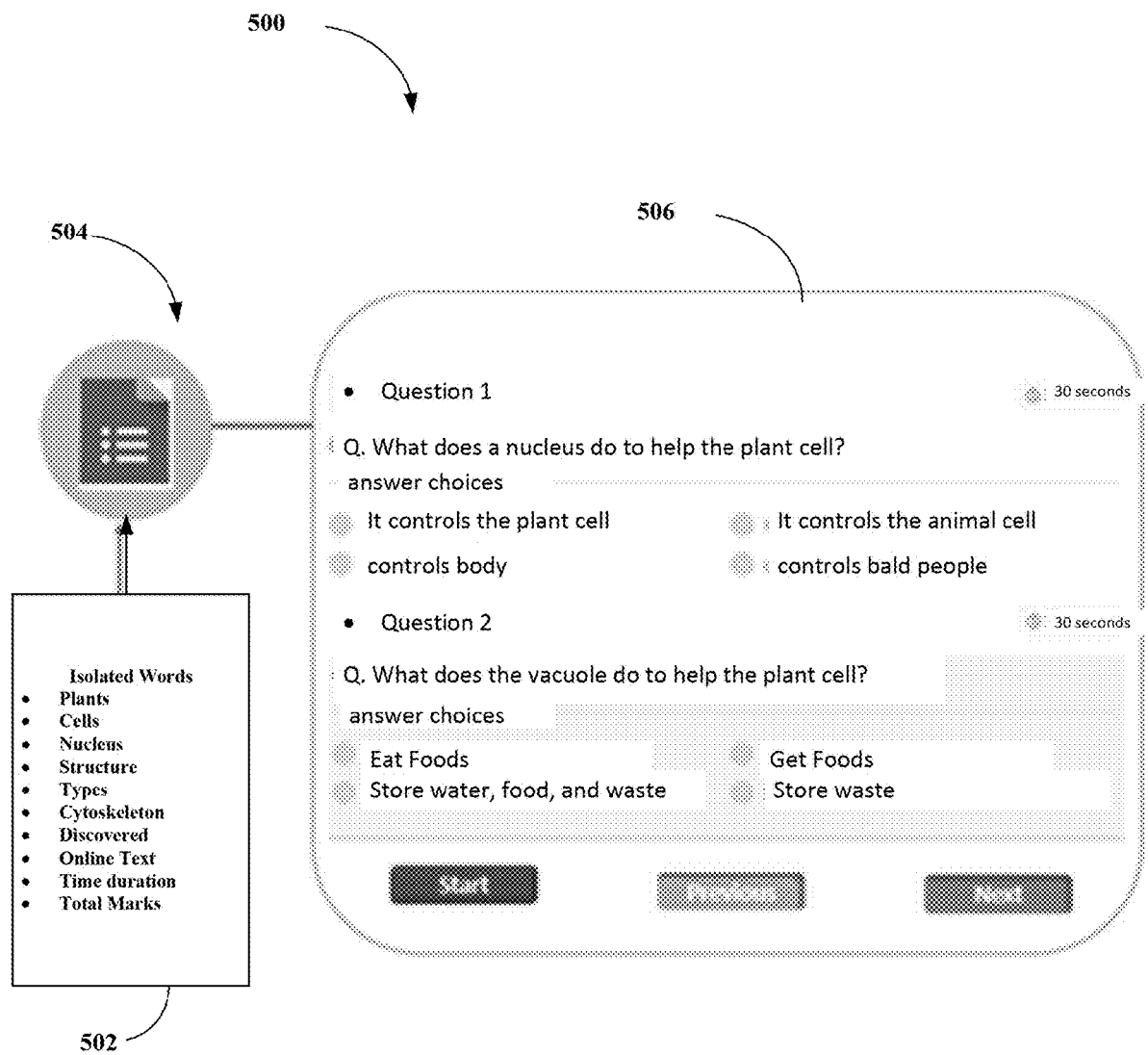
FIG. 5 illustrates an example quiz in accordance with exemplary embodiments of the disclosure.

FIG. 5 illustrates an example quiz 500 in accordance with exemplary embodiments of the disclosure. Isolated words 502 from a discussion may include "plants," "cells," "nucleus," "structure," "types," "cytoskeleton," "discovered," "online test," time duration," and "total marks." The words 502 may be applied to a game template 504 and a game 506 may be generated.

An example timeline may be used for each question to mark. Start, Next, and Previous buttons may be on the bottom of the template 506. Marks may be associated with each question. Threshold marks to pass the quiz may be generated. After populating the template, the system notifies the host that the gaming template is prepared and is ready to be shared with the participants. The system may automatically share the game, or the host may share the generated quiz with each participant and collects the results. The results may be evaluated based on correct answers and marks are given accordingly. In other variations of this method, teams are randomly chosen based on the total # of participants, in which case a team score is the rubric as opposed to an individual one.

Template Database

An open-source relational database management system such as MySQL is used to collect the information from NLP sources. The database that holds all the information related to challenge related elements for games that are required for gamification templates for both individual participant and team games.

The data stored may include a list of all the participants, device or platform preferences to receive tailored games, ability to receive offline or live games online, the historical records of the individual/team, the individual/team schedule (games played on certain dates), the history of all challenges related to the individual/team, individual/team results. Other types of data not mentioned related to the online collaborators may be stored to optimize the learning experience while delivering game content or for the rubric in scoring for meeting participants and/or students to be tracked. i.e., keyboard preferences, colors, even difficulty levels could be added.

Common In-Game Challenges

Challenge related questions or targets (right vs. wrong fact type, in-game premises) are presented to each game user and they may be in the form of a more literal querying format, or the challenges may be in the form of gamified meeting elements such as "Shoot only the apples on the tree that represent the valid statements regarding Project Nero." Targets may show a graphical element (resembling the game object) with a phrase that only appears when you hover it with your crosshairs. Players need to then only shoot the correct "apples" and the cumulative scoring reflects degree of knowledge-retention. Other examples may include moving through a graphical environment with textures (e.g., castle, caves, or simple maze, etc.) with a first-person perspective and various points an obstacle appears and in order to overcome the obstacle, a clue or key can only be provided once the correct answer to a challenge is chosen.

The method proposed ensures that the templates are populated by system using NLP-based, isolated keywords, like "Topic," "Sub-Topic," "Status" of the lesson lectured by tutor, or content delivered by a meeting host—other important details shared by a teacher may include "online exam," "timeline," etc. The templates are independently populated and are to be ultimately associated with the gaming-engine that contains the game mechanics itself such as the core functionality. The game is possibly prepared by a $3^{rd}$ party game developer (e.g., EA Sports, Activision, Treyarch, etc.) for the purpose of accepting the NLP derived elements to complete the game experience.

Figure 6:
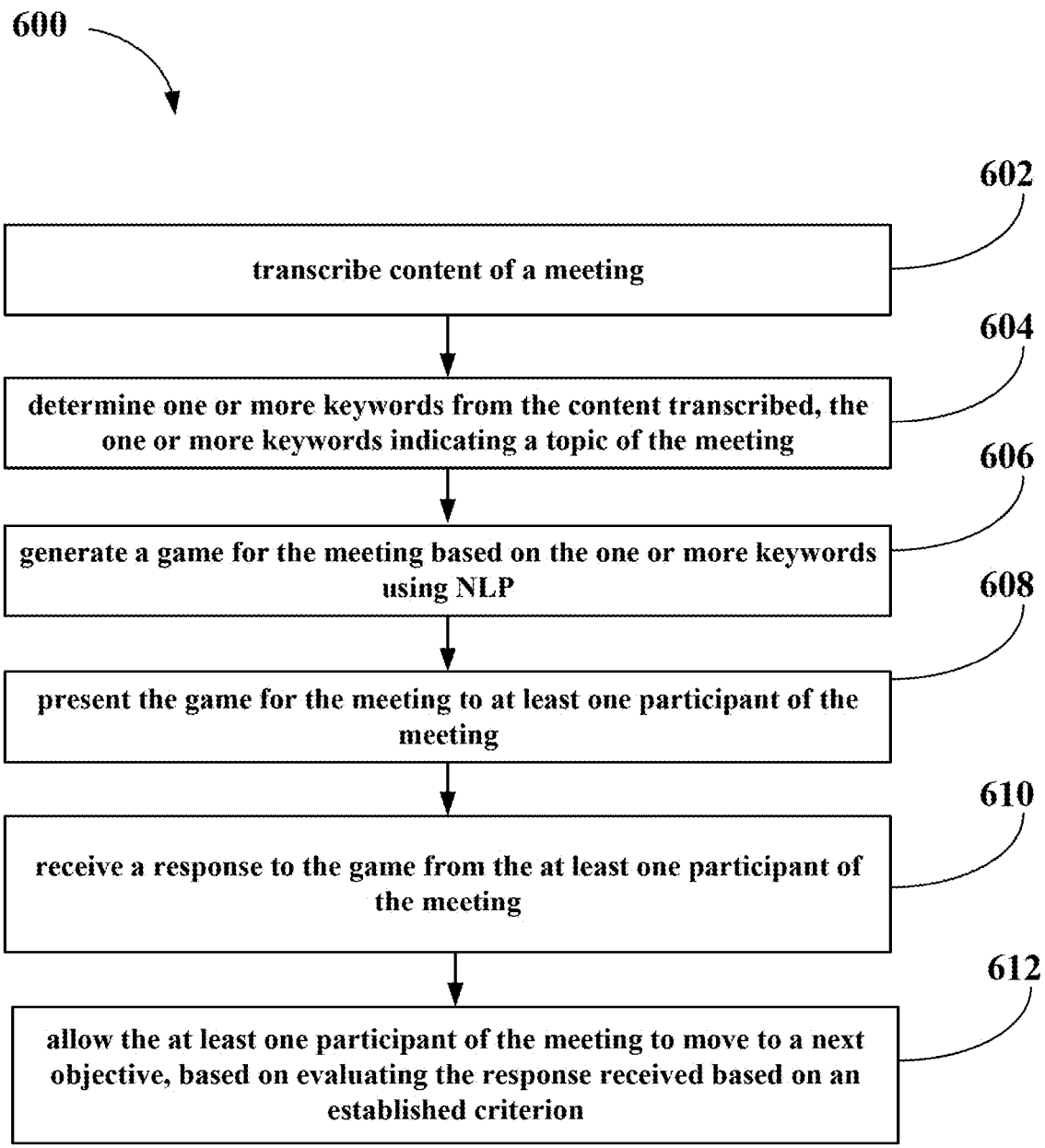
FIG. 6 illustrates a flow diagram and method in accordance with exemplary embodiments of the disclosure.

FIG. 6 illustrates a flow diagram and method 600 in accordance with exemplary embodiments of the disclosure. The method 600 is a method of automated gamification. The method includes transcribing content of a meeting (or proceeding) (602), determining one or more keywords from the content transcribed, the one or more keywords indicating a topic of the meeting (604), generating a game for the meeting based on the one or more keywords using NLP (606), presenting the game for the meeting to at least one participant of the meeting (608), receiving a response to the game from the at least one participant of the meeting (610), and allowing the at least one participant of the meeting to move to a next objective, based on evaluating the response received based on an established criterion (612).

Transcribing content of a meeting (602) may include transforming speech to text and storing the text. Determining one or more keywords from the content transcribe (604)

may include processing the text to look for words tied to a theme or themes of the meeting, which may be determined, for example, by reviewing the words used in the meeting as a whole or based on portions of the meeting. Generating a game for the meeting based on the one or more keywords using NLP (606) may include processing the list of keywords and applying the keywords to a game template. Presenting the game for the meeting to at least one participant of the meeting (608) may include transmitting the game to the participant and causing the game to be displayed to the participant. Receiving a response to the game from the at least one participant of the meeting (610) may include one or more of transmitting the response from the participant and receiving the response at a server. Allowing the at least one participant of the meeting to move to a next objective, based on evaluating the response received based on an established criterion (612) may include transmitting a result to the participant and releasing a hold at a particular objective.

In an example embodiment, transcribing the content of the meeting comprises auto-transcribing content of a virtual meeting.

An example embodiment may include detecting a start of the topic, introduced by a host of the meeting, in response to the meeting content. Detecting a start of the topic may include processing a transcript of the meeting and determining a first topic being discussed based on the transcript.

An example embodiment may include selecting a gaming template from a database in response to determining context of the meeting using NLP techniques on the transcribed content. Selecting a gaming template from a database in response to determining context of the meeting using NLP techniques on the transcribed content may include reviewing a catalog of gaming templates and choosing from the catalog.

An example embodiment may include using the one or more keywords to fill the gaming template. Using the one or more keywords to fill the gaming template may include reviewing a list of keywords from a transcript and applying the keywords to a template to generate a game.

In an example embodiment, populating the one or more keywords into the selected gaming template may include reviewing a list of keywords and applying the keywords to a template to generate a game.

In an example embodiment, selecting the gaming template from the database is in response to finding at least one keyword in the transcribed content indicating a purpose of the meeting.

In an example embodiment, selecting the gaming template from the database is in response to receiving input from a host indicating a purpose of the meeting.

Systems and methods can optionally include one or more additional features presented below.

A. Optimizing Meeting Participation by Adding Measurable Outcomes

The methods of the current embodiment provide for optimizing meeting participation by adding measurable outcomes. This can be achieved, for example, by establishing goals, yet requiring participation in achieving those goals measurably is not supported in existing embodiments. For example, adding attachments is a fairly static approach to share information (in a meeting invitation) with minimal impact or strategic purpose. By associating measurable outcomes (such as goals) and allowing participants to suggest a new goal that is partially (or completely) fulfilled is much more collaborative and novel, as compared to a traditional meeting invitation (that uses static text to infer an outcome).

The benefits of this embodiment include, but are not limited to, attendees join meetings with punctuality and with an awareness of the goals of the meeting. All of the meeting data, such as agenda, goals, documents, and notes, are all together in one locale and provide an audit trail of the dialogue within.

Method steps of this embodiment include:
  (1) Sending a meeting invitation.
  (2) Adding in measurable outcomes, such as goals.
  (3) Tying in an agenda that is less uncoordinated and more autonomous.
  (4) Adding documents that are associated with stakeholder representation and key dependencies.

B. Adapting Social Media Spaces for Meeting Invitations

The methods of the current embodiment provide for embedding forum-like discussions in what would otherwise be static invitations. Meetings typically contain a pane or section for additional information like agenda topics and conference coordinates.

Method steps of this embodiment include:
  (1) User inputs content into a field, such as updating an agenda.
  (2) Other users can see the same updates; however, the updates to the invitation need to be submitted (i.e., sent) before other users can see the updates.
  (3) A real-time forum-based discussion is added to the meeting construct.
  The benefits include, but are not limited to (i) similar to having an inbox within an email or, in this case, a calendar invitation, and (ii) all participants are able to converse within the meeting invitation, thereby ensuring all of the meeting data, such as agenda, goals, documents, and notes, are together in one place and provide an audit trail of the dialogue within.
  (4) Users are able to socialize within the forum chat and spawn further threaded discussions embedded within calendar invitation.
  (5) Participants can vote on the content within the forum-chat, including adding images, text and emojis.
  (6) It is also possible to convert participant's contributions (agenda items and notes) into actionable items (i.e., Task 1, Task 2, etc.).

C. Feedback Mechanism to Improve Conference Media Stream Quality

Methods of the current embodiment provide recommendations to users to optimize video and audio. While older systems typically poll the user, e.g., "how was the quality?;" systems do not recommend to users real-time any actions to be taken ASAP to improve the quality "on the fly."

Method steps of this embodiment include:
  (1) A user is engaged in a media-based communications session, such as a video call or a voice call.
  (2) System detects a factor or series of factors affecting the media quality, which can result in an action to bypass the problem.
  (3) System proactively suggests a highly likely contributing factor affecting media stream quality to equip the user with key knowledge to troubleshoot an issue.

For example, if user Tristan is rustling papers, the interface, in accordance with an embodiment, may prompt the user and state "you're being kind of loud at your conference location," . . . etc. Another example may be if a YouTube™ or Netflix™, or similar type session is running, the exemplary system may recommend, "Tristan, a web session running in the background is affecting the conference video quality. Consider turning it off." And another, when echo is detected, the exemplary system recognizes that Sonny has not yet turned off his microphone.

D. Professional Spaces Within a Meeting Environment for Purposes of Collaboration Methods of the current embodiment provide a means for all meeting stakeholders to serve up content that is associated with their profile (such as their work-related files) and that such content would be pertinent to the meeting's goals/stakeholders. The user then always has content or related other goals OR part to contribute to the bigger picture (project related) being published within the meeting apparatus.

Today, this might include a web link to an external networked or cloud-based storage site; however, the proposal is to embed the critical meeting resources for a participant with their tasks, goals, and/or meeting-related requirements. Often, users see an interface link or button for more information; however, in a meeting-oriented apparatus, such as an event scheduling or calendar application, this is absent.

Method steps of this embodiment include:
  (1) Users within a workgroup have tasks that are being managed within a larger objective-oriented framework (i.e., tracked tasks and measurable outcomes).
  (2) A meeting is called by a key stakeholder and invites one more member of the workgroup.
  (3) Specific goals or tasks are included in the meeting invitation and this includes actionable items, such as expectations to complete a task with a measurable outcome ("Deliver draft specification for team review by DATE.").
  (4) The user identified within the requirements for the meeting may set their presence indication to "ALL" or "Some" of the tasks have been completed.
  (5) Meeting participants can then click on a user's profile to see the relevant files that are "pushed" by a user for the meeting at hand.

For example, the current embodiment may include the following:
  Background (old): During the meeting, "I'll send you that file."
  Invention (new): "Sonny, help yourself—the specification we all need to review is under my profile."

E. Interacting with Transcribed Content to Improve Productivity

Methods of the current embodiment provide for live transcription to generate content over which participants can collaborate to improve productivity. Live transcribing of meeting proceedings or communication sessions leads to a raw-data view, which, once analyzed, can be processed through NLP techniques to produce meeting highlights. These highlights can then be tagged to create autonomously derived decision-points, then even assigned to the key participants who were speaking during the segment of relevance in the meeting (or outside of the meeting). Furthermore, load-balancing based on the tagging action may help to avoid over-tasking an individual already identified as a participant with a workload that has been identified within a meeting apparatus.

Method steps of this embodiment include:
  (1) Meeting or communication session (recording a live meeting or speaking during a phone call) between participants is underway.
  (2) A transcription is created as a real-time event OR resulting from post-processing.
  (3) The transcription is analyzed using natural language processing techniques to parse the segments into discrete word phrases, where the determination of keywords results from a comparison to a corpus, then filters are applied to determine the keywords that form the basis of topics and actionable phrases ("take the action"+{verb phrase}+{noun phrase}, etc.) as an exemplification of a process.
  (4) The meeting or communication system can then create task-flows and/or summary-reports of the artifacts resulting from the discussion to track outcomes OR simply inform the participants over what was said in terms of highlights.

Advantageous aspects of the current embodiment may include, but are not limited to:
  converts content into actionable items. This can be done by the stakeholders OR automatically using NLP and machine learning;
  automates the note-taking process, where verbatim accounts are less helpful;
  empowers meeting participants to be more productive and listen with fewer distractions;
  distills rambling discussions into key points, pending decisions, actions, etc.; and
  provides useful metrics regarding proportion of meeting spent on topics, or off-topic.

F. Meeting Content and Facilitator Scoring to Enhance Collaboration and Intellectual Property Protection Methods of the current embodiment provide a means for meeting participants to rate the effectiveness of a meeting or score the degree of association with meeting content. This method is helpful to properly assign the originator of an idea (based on learned content) expressed in a meeting. For example, it could be helpful to accurately name inventors in R&D gatherings or such environments where attribution is crucial (i.e., sales, etc.).

Method steps of this embodiment include:
  (1) When a meeting is completed, participants are offered a user-interface to rate the effectiveness of the presenter(s) and the overall score of the meeting.
  (2) Participants can also be tagged with ownership or degree of contribution for ideas that were expressed during the discussion.
  (3) The system either auto-generates the ideas that were expressed or offers participants to mention the key topics or ideas that were raised and who conceived them.

G. Highlight Reel Meeting Output to Improve Collaborator Efficiency

Methods of the current embodiment provide a "reel" during the meeting that is available to encapsulate the different media events, including video content (slides displayed, etc.), audio overview, public chat instances, and the order in which each stakeholder participates (e.g., "Sonny's Moments: 2:28, 4:34; 8:45").

Method steps of this embodiment include:
  (1) When a communication session is underway, all the events that were underway, including video, audio, chat, and presence indicators for each participant, are recorded.

(2) The audio recording is transcribed, and video facial recognition technology may be applied as well to isolate the identity of the participants.

(3) Events are then added to the resulting output to create highlights, such as the time each participant spoke, links to specific moments (i.e., when user x joined or exited, beginning of presentation), an interactive timeline (topics introduced), and even a quick catch-up option that accelerates the reel to avoid wasting everyone's time recapping the missed portions.

Advantageous aspects of the current embodiment may include, but are not limited to:

Links allow users to jump to specific moments in the reel and allow late (or distracted) participants to catch up quickly.

The reels are also standard output to elevate meeting output to include all the events and not just record the audio or video.

Moderators or participants can manually tag reels to allow follow up at specific moments during the collaboration.

H. Participant Reaction Based Voting for Meetings

Methods of the current embodiment equip meetings with voting options just like agenda items; furthermore, goals/tasks are scored using a similar technique. The exemplary system may measure outcomes using emoji-based lexicon and, for example, move off an agenda item depending upon what input is provided by participants to determine outcomes (such as move forward, stall to discuss further, etc.). Specific emojis could create a more collaborative technique to determine a user's sentiment regarding a meeting response: Fewer words are required, unhappy emoji is more palatable than "I don't like the idea," "as much as I believe the strategy to . . . it adds more risk, we need to be more conscious of time to market, I vote to proceed" as opposed to a meh' or slightly enthusiastic emoji.

Today, emoji-based interaction is prevalent, as well as requests, such as to "Like" or "Dislike" content; however, it is used rather informally and not used in measuring outcomes of workplace gatherings. The current embodiment provides the full spectrum of emotional indicators from a systematic morphology to apply decision-making and evaluation within a meeting apparatus.

Method steps of this embodiment include:

(1) A meeting-based lexicon is submitted by the organizer of a meeting. It may be a more restrictive set of emojis or a more flexible set of emojis, like in a brainstorming session (no wrong answers).

(2) During a meeting OR at the end of a meeting, the facilitator may invite participants to use small digital images or icons from the lexicon to express an idea or emotion regarding the subject matter in the meeting.

(3) The participants react to specific discussion points that the facilitator served through the meeting apparatus.

(4) The facilitator receives the results and can interact further with the participants to understand why they reacted in the way they did (for example, "Zoe, you expressed confusion over the proposal. Can you elaborate?").

(5) The results are archived and may be matched with user's input to create an irrefutable record regarding voting tendencies for later reference.

Advantageous aspects of the current embodiment may include, but are not limited to:

Throughout the conversation, participants add reactions to show support and excitement about the discussion.

Participants also have the option to thumbs up different sections to show that they agree with the topic being discussed.

I. Methods of Gamification for Unified Collaboration and Project Management

The methods of the current embodiment provide the outcomes of workplace situations, such as decision-points, assigning responsibility, and solving problems to be determined based on the gamification of content derived from a discussion. The discussion may be an online discussion or as part of a meeting facilitator function monitoring a live discussion (i.e., user with mobile app at a café with stakeholder(s) at a table).

Method steps of this embodiment include:

(1) Content is generated from a discussion. The content may be derived from an online meeting (transcription; keyword detection; topic detection; etc.). Content may also be based on a live discussion that is recorded for post-processing (i.e., recording; transcription; keyword detection; topic detection; etc.).

(2) During the meeting, the gamification function is applied depending on user preferences and presents the participants with quizzes or challenge-phrases to verify the stakeholders are aware of what was just presented, etc. In another embodiment, an alternate game (other than just a word game or quiz) may be played to achieve a result designed by the facilitator (facilitator pre-configuration and entry into a game template-construct leads to a desired result that is to be achieved by the participants until the next phase of the meeting can continue).

(3) In another embodiment, the system may display a set of findings that become the basis of a game requiring interaction by the participants. Rules may be applied preventing the participants from moving to the next agenda item until a team or individual goal is achieved. A game structure is created to allow it to be populated with content derived from the meeting.

(4) In another embodiment, the facilitator can offer participants games to decide who is assigned actions. This goal-oriented approach is intended to invite interaction and learn about work-oriented subject matter.

Advantageous aspects of the current embodiment may include, but are not limited to:

Unassigned meeting actions and tasks are determined based on the outcome of quick games between participants.

Actions that are not completed on time result in gaming concepts being applied, such as "You're in the penalty box."

Quick games may also resolve unassigned tasks and goals, e.g., TBC, Tic Tac Toe, Hangman.

The idea of using gaming strategy to solve problems is also interesting because it can result in the participants engaging in such concepts as "before we can end this discussion, we need to open the Chest of Jewels OR open the secret portal. How do we do that? Answer: Come up with 5 tasks that will help us achieve the project deadline."

J. Ultrasonic Beaconing

Methods of the current embodiment include using ultrasonic messaging in a communication system to enable each device logged into a meeting (audio or audio+video) to broadcast a unique device identifier. Every device that has a microphone capturing audio could then listen for ultrasonic messages that indicate another device that is on the call within audible proximity. This device proximity data would be transmitted to the CloudLink™ Meeting Platform, allowing a provider to orchestrate the user experience of collaboration devices that are co-located.

Method steps of this embodiment include:
(1) All audio lines broadcast an ID every X number of seconds @ 19 kz—or near ultrasonic sound.
(2) The cloud application, or equivalent, of the present embodiment has an awareness at all times of devices that are within audio range of each other.
(3) When there is more than one device present, the cloud application is aware of which user it belongs to.
(4) The Cloud Link Meeting Platform is then aware of the roles of each device in the meeting.

K. Automatically discovering collaboration-enhancing devices, such as displays, cameras, speakers, and microphones Methods of the current embodiment provide the ability to discover and utilize collaboration hardware to add to the value of meeting experiences when at least one participant is in a conference room. This analysis can determine the ability to discover devices that are most likely to exist inside of a "Huddle Room," which is defined as a small conference room with common off-the-shelf displays, cameras, speakers, and phones. The system of the current embodiment includes the programmatic (auto) discovery of devices using either a Mac/Windows computer or iOS/Android device.

Method steps of this embodiment include:
(1) System detects all possible devices, even those considered not compatible.
(2) System connects through an open media connection that permits communication (i.e., SMS, email, WiFi attempt (Bonjour, iMessage, etc.), social media, etc.).
(3) User is offered a collaboration link, such as a meeting invitation.
(4) Alternatively, system maintains a list of trusted connections, apps, and users to determine a path of connectivity to offer the user a link or other means to connect to the meeting.

L. Autonomous Meeting Facilitator

Methods of the current embodiment provide an autonomous meeting composer, i.e., a system-directed capability that calls meetings with the stakeholders based on an intake of digital information which may be based on keywords extracted from conversations (transcribed from interactions between users), or requirements stated in emails, chat, etc.

Method steps of this embodiment include:
(1) Content source is analyzed for meeting topics, such as risks, actions, planning, goals, etc.
NLP techniques can be leveraged to isolate words that form the basis of an agenda and the identified participants.
(2) The system then calls a regular meeting (i.e., just a booking; possibly with keywords used to call an agenda and/or meeting purpose/title) OR an enhanced meeting using detected goals, crucial milestones, etc. to work towards key objectives that were identified OR allow participants to set their deadlines. Participants may also create additional goals or tasks or modify system generated ones.

Advantageous aspects of the current embodiment may include, but are not limited to:
Actionable items are generated based on transcribed content.
Participant's availability is used to book completion of previously identified goals, plus add new ones in a meeting.
Stakeholders don't initiate closing of a goal or task; the system autonomously books key engagements with identified stakeholders with measurable outcomes.

M. Advising Meeting Participants of Their Contributions Based on a Graphical Representation ("Heat Map")

Methods of the current embodiment provide a collaboration system configured to measure the contributions of its participants and present the contributions using graphical representations ("heat maps;" classic metering, scoring, etc.).

Method steps of this embodiment include:
(1) Participants in a collaboration session (i.e., meeting)—not necessarily an online discussion, since tracking participants in a live discussion is possible using smartphones—using, for example, speech recognition techniques, such as speech format characteristic detection OR device detection OR caller-identification, etc.
(2) Metrics are gathered and maintained for each speaker, for example, frequency of words spoken, speaker duration, primary engagers (i.e., when you speak, this person interacts with you the most).
(3) The system prompts each participant AND/OR the facilitator/leader on the level of participation. User may be prompted by the system to engage more. Facilitator may prompt a participant to engage more. System may prompt a participant to engage less when a particular speaker talks. System advises all participants on their level of effort in the collaboration session (shows how much they are speaking; graphical display; colored alerts). System throttles down the discussion based on speaker traffic (i.e., system-initiated breaks, breathing exercises, video game, automatically raising a hand for a less engaging speaker, etc.).

Advantageous aspects of the current embodiment may include, but are not limited to:
System helps a participant more effectively engage the other participants in a meeting equally using a 'contribution heat map' function.
Visual cues are used in real-time to steer the conversation towards the meeting goals.

N. "Shoulder Tap," aka Lightweight Intrusion Technique to Ask a Question During a Collaboration Session Methods of the current embodiment include a subtle meeting intrusion, thereby not interfering with an ongoing collaboration session. The methods can also be used to hold off an intrusion and deliver it later OR itemize it for closure at a later date, like a meeting action. Traditional applications merely offer a screen pop to inform the user of transient content.

Method steps of this embodiment include:
  (1) During a collaboration session, when a co-participant has a query or suggested action for another participant, the system offers a new media session to be created (i.e., video call) to foster interaction, e.g., the system offers a video session OR audio message within a meeting already underway.
  (2) System determines the level of engagement, such as the participant is reading a document or presentation, talking, hearing a response to a question that they asked, or temporarily away from their desk. If a user is distracted or busy (based on system detection), the "shoulder tap" is delayed until the user is available. If the user is busy, then they can leave a message (voice note; pending question to be answered; etc.). Evolution of call waiting for collaboration.

O. Smart Meeting Detection (aka "Scouting") as a Service

Methods of the current embodiment include skillset matching for the purposes of including proper personnel in cross-functional and self-directed environments. The improvement to professional development by speeding up the decision-making, allowing hosts/facilitators to factor in the availability of the right experts for meetings and giving participants new ways to contribute their perspective leads to an optimal collaboration experience. Far too often, the right people are not available OR a meeting is booked, positing that by calling the meeting, it should preclude that the right people attend. However, the trend in the industry is towards teams that are cross-functional and self-directed, meaning that people with varied expertise and background may be called upon in the absence of a classic expert.

Method steps of this embodiment include:
  (1) When a meeting is proposed, the system refers to a database for the skillset-related keyword matches, i.e., the meeting agenda, title, and skillset arrays based on previous meetings is leveraged.
  (2) If a participant is not available, the system pushes similar skillsets highlighting expertise not previously known, based on user profiles created by users themselves and/or management (résumés, performance reviews, Social Media, etc.).

Advantageous aspects of the current embodiment may include, but are not limited to:
  makes meeting participant recommendations for hosts to consider;
  invites participants based on the selected topic and the individual's expertise;
  advises when a participant is overloaded or overtasked;
  individuals can indicate their invite preferences, and non-critical teammates have the option to delegate the responsibility of attendance to a human colleague or to their artificial alter-ego;
  alter-ego helps non-attendees create a video recording of their perspectives while voicing over key documents;
  system introduces this alter-ego or surrogate representation at the right time in the meeting while they are not in attendance;
  solves the problem of meeting-overload; and
  employees can divulge their areas of expertise to equip the system with proper skills to delegate automatically.

P. Expression Engine

Methods of the current embodiment provide a means to express ideas during a collaboration session that spawns collaboration related interaction. For example, if users can sketch a diagram to communicate, then the system uses built-in webcams OR a smartphone camera to integrate the expression, then additional tools become available, such as supplementing the diagram with voiceovers, which can be attached to sketches as users record their drawing, which are auto-transcribed to add more nuance and explanation to the visual. This would be very useful in mechanical design environments or in architecture. However, it can also be used in project management and software design sub-disciplines. Furthermore, the system could also adapt an idea expressed and polish it up or enhance it for presentation mode.

Advantageous aspects of the current embodiment may include, but are not limited to:
  The receiver can easily annotate further on this idea, transforming the sketch into an infinite digital whiteboard.
  Workers can also seamlessly transition into live collaboration from the main expression canvas space or chat, which maintains the original chat context and live transcribes the meeting to feed back into the chat.
  A participant can sketch an expression of their meeting-related idea, then using Google™ image recognition, optionally serve up related imagery to assist a user in expressing their idea. This dynamic search setting can be disabled.

Q. Surrogate Meeting Representation

Methods of the current embodiment include a virtual surrogate that collects and provides input from attendees who cannot attend to ensure absentees' voices are heard. The system learns using natural language processing and machine learning to process dialog and deliver responses that are based on a known corpus familiar to the primary stakeholder. Generally, the technique relies on a general corpus to understand what users are saying to interpret meeting-oriented dialog and a custom corpus to create a most relevant lexicon where the tacit knowledge resides to assist the user in building relevant responses based on their body of work and subject expertise.

Surrogate meeting representatives are different than avatars that are being used already by meeting and collaboration providers.

Method steps of this embodiment include:
  (1) When a user is not available to attend a meeting, the user initiates a meeting surrogate.
  (2) The meeting surrogate is then able to process the natural speech provided by the participants.
  (3) If/when prompted for the key stakeholder who is unable to attend to elicit a response, the system generates a response based on the body of knowledge that is based on a time-relevant snapshot of data (emails, presentations, previous conversations, etc.). The system may even support turning off the auto-pilot temporarily (perhaps they are busy and listening in, therefore they can monitor and barge in on the surrogate to override responses and deliver a specialized one).

R. Icebreaker Generator

Methods of the current embodiment propose a system-level intermission or "icebreaker" to be generated whenever meetings get monotonous or if a facilitator can predict the point at which a break is required. Research shows that participants get comfort and enhanced productivity by collaborating and contributing content, ideas, etc. after an icebreaker. However, current systems do not include such events built into a collaboration facility or meeting scheduler.

Method steps of this embodiment include:
  (1) Facilitator or leader books a meeting.
  (2) The configuration interface allows the facilitator to predict when an icebreaker is required.
    It may be when a number of users start getting fidgety (i.e., after start-time, when room ambient noise amplitude suggests an icebreaker).
    System may only notify the facilitator.
  (3) Alternatively, if the system is programmed to "break the ice" every 45 minutes, for example, the screen changes and a planned event is displayed (e.g., GIPHY, suggested clip from a library of clips, or a funny audio clip is played for audio-only participants).
  (4) The system is aware of when breaks are required (timed or audio detection).
    However, participants can also lobby for an icebreaker, which may include a "bio break" followed by, or concurrent with, the "icebreaker."

Advantageous aspects of the current embodiment may include, but are not limited to:
  System automatically cues participants with an automatic icebreaker that is generated following a few different triggers, such as, for example, meeting length, dispute detection, dialog-complexity detection (NLP=off-topic detection; complex language being used; remarkable spaces between responses, i.e., lethargy, etc.).

S. Meeting Kickstarter

Methods of the current embodiment include aggregating a meeting's content and creating a summarization to preempt the discussion and increase participant engagement.

Method steps of this embodiment include:
  (1) When a meeting is being staged, the exchange of information between the stakeholders is monitored.
  (2) System aggregates the relevant content between stakeholders OR shared in a common space.
    Information is mined and analyzed for topics (NLP).
  (3) System parses the keywords using adjustable methods to determine the degree of relevance. Keywords and topics are identified plus additional sentences before and after; percentage of supplied context is adjustable.
  (4) Context and highlights are moved to a template.
  (5) Summary is sent to the stakeholders before the meeting. Preemptively engages the audience (i.e., known recipients) and learned context is summarized in a template.

Advantageous aspects of the current embodiment may include, but are not limited to:
  "If you don't attend, here is what you're missing . . . "
  "As you can see, most of this upcoming meeting is a rehash of the earlier discussions. Plan to attend or not accordingly."

T. Dry Run Meeting Facilitator

Methods of the current embodiment include facilitation of meeting presenter's "dry run" of meeting content and obtaining feedback on their delivery.

Method steps of this embodiment include:
  (1) A presenter of prepared meeting content (PowerPoint, Keynote, etc.) selects "simulation" mode.
  (2) The simulation mode allows the user to present their content, while the system monitors:
    system monitors the spoken content AND/OR the written words.
  (3) System applies rules of conformance based on social settings (formal, informal, etc.). Detection of wordiness is executed, and changes are recommended through annotations or scoring on passages of text (findings in report).
  (4) Presenter's delivery of content is evaluated as well. A "keynote evaluation" mode might provide voice coaching to optimize orator's skills. Rapid word detection, i.e., "please slow down;" amplitude detection, i.e., "please speak louder" . . . OR "more softly;" tonality detection, i.e., "You sound monotone: Please try to annunciate your spoken sentences more."
  (5) Additional function allows test audience to annotate content while watching or listening to the presenter deliver content. As an annotation tool, this function allows users to directly interact with and apply updates to the content that is being driven by the presenter.

Advantageous aspects of the current embodiment may include, but are not limited to:
  provides a more collaborative way to get review feedback by seeing presentation decks in action; more effective simulation of delivery;
  audience is furnished with functions to evaluate speaker AND content;
  test audience can also provide live feedback similar to broadcasted debates where audience upvotes or downvotes during the presenter's dry-run; especially helpful for seasoned veterans (i.e., CEOs, etc.);
  system also provides automated coaching in private tutoring mode; and
  system can also automatically generate a meeting script based on past sessions; system uses a past-recorded meeting database to aid inexperienced presenters; and system applies NLP techniques to suggest preamble, idiomatic expressions, etc., generate smalltalk, etc.

U. The Non-Meeting Generator

Methods of the current embodiment provide participants a means to determine measurable outcomes before a meeting has occurred to, for example, determine if the goals have been met, and therefore the meeting is no longer required. When a meeting needs to be called, the participants often "blindly" attend, not knowing if the objectives have already been met. If, however, a non-meeting generator could facilitate the initial entry and tracking of goals or actionable items, then when a to-do list is properly checked off, a meeting does not have to be called anymore.

Since online "to-do" lists exist already, if a meeting facility or event scheduler was intelligent enough to leverage artifacts, such as minutes, video-conference footage, transcription services, etc., and able to formalize the words used (based on descriptions of problems derived from a sentential calculus), then it may be possible to create a statistical method to determine an outcome, such as solving the problem of whether or not to book a meeting, to update an existing meeting, or to cancel a meeting entirely.

V. Digression Detection and Avoidance ("Conversation Parking Lot")

Methods of the current embodiment include a meeting system or scheduling application configured to conduct analysis of disparate conversations that are not contributing to the measured outcomes OR agenda items during a collaboration session.

Natural language processing can be used to isolate side conversations by listening in using an ultra-sensitive microphone or remote satellite microphones. Furthermore, smartphones equipped with productivity software can monitor the audio levels during key discussions and alert the facilitator that a participant has been identified that may be distracted or is conducting a separate conversation.

If the system detects a participant is holding a separate conversation, etc., it may prompt them "Would you like to park this conversation on the topic of XXXX?" This encourages the participants to pick up the dialog later (perhaps book a reminder via another form of media OR invite someone for a post-meeting chat), as opposed to simply being alerted that the participants are creating noise and to end the side chat which may be crucial despite the fact the topic was off-topic.

Method steps of this embodiment include:
(1) Conversation during a meeting is underway between participants.
(2) System monitors all the devices that are registered with the conferencing or meeting software.
(3) System alerts facilitator that distractions are detected.
(4) System may offer a follow-up discussion be created that is derived from the keywords included in the distraction.
(5) Alternatively, the user is notified that they are distracted OR that the meeting participants are distracted.

W. Virtual Meeting Attendee

A method of the current embodiment includes techniques that, if a participant is unable to attend a meeting, they can opt to send in the meeting filler.

Method steps of this embodiment include:
(1) Meeting invites a user to attend.
(2) User cannot attend the meeting so assigns a virtual attendee or delegate.
(3) Virtual meeting attendee listens for certain keywords identified by the user ahead of time.
User enters a list of keywords they want to either be notified about OR to trigger a response from the virtual meeting attendee.
User enters keywords they would like extracted from the meeting.
Standard transcription would detect every word spoken, including content that is simultaneously being presented.
User can adjust the amount of context desired and system may supply relevant content for later consideration.
The system can also supply system responses in the form of a synthetic voice-assistant based on a scripted response provided by the user OR in the form of a text-based response. During a meeting, the system may time a response based on a command from the meeting participants OR be prompted to virtually present when a command is issued by the meeting platform.

X. Tinder for Work

A method of the current embodiment includes a "matchmaking at work" system based on professional attributes as opposed to personal. Professional workforces demand their workers be strong in certain skills depending on the role. Matchmaking that allows a worker to highlight certain skills they would like to develop in addition to certain key interpersonal strengths to ensure compatibility encourages more effective knowledge transfer and mentoring. Management can even encourage relationships between workers based on compatible attributes and requirements.

Method steps of this embodiment include:
(1) System recommends certain skillset be targeted based on management need or in the event a worker leaves the organization.
a database or record of the skillset requirement is created (i.e., employee changes, hiring requisitions, etc.).
many workplace management utilities manage and centralize this type of data (e.g., Concur).
skillsets and experience may be mined from existing HR databases, too, including résumé-based searches, social media, etc.
employee mentorship programs also identify personal goals and opportunities (e.g., if SW Development wants to move to Product Management; has business diploma from XYZ College).
(2) The requirement is fulfilled using a meeting application or calendar booking utility. System automatically detects requirements based on attendees present vs. those who cannot attend.
when an employee is not available OR if the required skillsets identified within the meeting application are not available, the system pushes new skillsets based on their availability.

Y. Auto Status Visualizer

A method of the current embodiment "scrapes" the activities and situational data of workers and then auto populates their customized avatar with current status and availability. The methods drive status updates based on IOT sensors, smartphone location services, fitness gear biometric readings, media preferences (e.g., "Parker is listening to Rush on his laptop and is working on two presentations at the home office.").

Ultra-dynamic status indication is based on the idea that people's status is directly tied to their personal device status (smartphone, vehicle, watch, fitness/health tracker, computer, IOT endpoints, etc.). For example, remote workers need extra context about what activities are happening in the office. It helps people at work and especially remote workers maintain balance, focus and avoid interrupting situations where they would otherwise be able to see someone's obvious status while in the office.

Standard presence is replaced with hyper presence OR ultra-dynamic status, such as "Downloading a file," "Avoiding distractions," "Dealing with a crisis," "Walking to the . . . " "Buying snacks or drinks at the vending machine," "talking to Mark at the photocopier," "Mark is eating lunch at Jojo's desk," "Watching a Tonight Show clip on his iPhone in the courtyard," etc. While remote workers benefit by a more detailed status other than the generic status updates, this idea ensures people are more in tune with their work environments and how they interact with them. The system relies on device presence and user presence; IOT drives more dynamic updates; "Jojo is freezing his hands off at the bus shelter."

The systems and methods disclosed herein collectively address the needs of meeting users by getting more utility out of the information that is supplied to collaboration and event scheduling applications. Furthermore, the methods and ideas disclosed allow users to increase their productivity based on the detection of such information and by applying techniques not traditionally used in meeting applications to create a more results-oriented experience that is more engaging and to make meetings more effective.

The present invention has been described above with reference to a number of exemplary embodiments and examples. It should be appreciated that the particular embodiments shown and described herein are illustrative of the invention and its best mode and are not intended to limit in any way the scope of the invention as set forth in the claims. The features of the various embodiments may be standalone or combined in any combination. It will be recognized that changes and modifications may be made to the exemplary embodiments without departing from the scope of the present invention. These and other changes or modifications are intended to be included within the scope of the present invention, as expressed in the following claims.

What is claimed is:

1. An electronic communication device for generating an electronic game during an online meeting presented by a meeting server, the device comprising:
   at least one processor in communication with the meeting server and configured to generate the electronic game during the online meeting;
   a natural language processor (NLP) in communication with the at least one processor and configured to process online meeting content and transmit the processed online meeting content;
   a transcribed content database in communication with the NLP and the at least one processor and being configured to store the processed transcribed content transmitted to it by the NLP;
   a library of gaming templates, wherein the library of gaming templates is in communication with the at least one processor;
   a memory in communication with the at least one processor, the memory including a first set of instructions configured to cause the at least one processor to transcribe the content of the online meeting; and
   a content analyzer in communication with the at least one processor and the transcribed content database, wherein the content analyzer is configured to determine important content of the online meeting by analyzing one or more of keywords and topics of the online meeting located in the transcribed content database or transmitted to it by the at least one processor;
   wherein the memory further includes (a) a second set of instructions causing the at least one processor to generate a game for the online meeting by accessing the library of gaming templates, selecting a suitable gaming template and populating the gaming template with some of the keywords, wherein the game is configured to verify knowledge of key facts presented during the online meeting; (b) a third set of instructions causing the processor to transmit the game to at least one participant device associated with a participant of the online meeting; (c) a fourth set of instructions causing the processor to receive a response to the game from the at least one participant device; and (d) a fifth set of instructions causing the processor to allow the participant of the online meeting to move to a next game objective based on evaluating the response.

2. The electronic communication device of claim 1, wherein transcribing the content of the online meeting comprises auto-transcribing content of a virtual online meeting.

3. The electronic communication device of claim 1, wherein the memory has a sixth set of instructions that cause the processor to detect a start of a topic of the online meeting during the online meeting.

4. The electronic communication device of claim 1, wherein the memory has a seventh set of instructions that cause the processor to select the gaming template from the gaming template library in response to determining a context of the online meeting using the transcribed content stored in the transcribed content database.

5. The apparatus of claim 3, wherein the processor is configured to, by accessing and analyzing the transcribed content in the transcribed content database, determine a start of a topic.

6. The apparatus of claim 5, wherein the memory has an eighth set of instructions that cause the processor to populate the topic into the selected gaming template.

7. The apparatus of claim 1, wherein the processor is further configured to, by accessing and analyzing the transcribed content in the transcribed content database, determine an end of a topic.

8. The apparatus of claim 1, wherein the processor is further configured to select the gaming template from the gaming template library in response to receiving input from a host via a host device in communication with the at least one processor, wherein the input indicates a topic of the online meeting.

9. An electronic communication method for generating an electronic game during an online meeting that is presented by a meeting server, wherein the method comprises the steps of:
   a processor in communication with the meeting server and transcribing content of the online meeting according to a first set of instructions stored in a memory;
   using a NLP to process the content of the online meeting;
   storing the processed, transcribed content in a transcribed content database in communication with the processor and with the NLP;
   using a context analyzer in communication with the transcribed content database and with the processor, analyzing the processed, transcribed content and determining one or more keywords in the processed, transcribed content, wherein the one or more keywords indicate a topic of the online meeting;
   the processor selecting a game template from a library of game templates, wherein the library is in communication with the processor, and the selection of the game template is based at least in part on keywords;
   the processor placing at least some of the one or more keywords into the selected game template, and generating a game for the online meeting;
   using the processor, presenting the game to at least one participant device associated with a participant of the online meeting;
   the processor receiving a response to the game from the at least one participant device; and the processor allowing the participant of the online meeting to move to a next objective of the game based on (a) evaluating the response received from the at least one participant device, and (b) established criterion provided in a second set of instructions stored in the memory.

10. The electronic communication method of claim 9, wherein the step of the processor transcribing the content of the online meeting comprises auto-transcribing content of a virtual online meeting.

11. The electronic communication method of claim 9 that further comprises the step of detecting a start of the topic by analyzing the processed, transcribed content.

12. The electronic communication method of claim 9 that further comprises the step of the processor selecting the gaming template from the library of gaming templates in response to determining the context of the online meeting by using the processed, transcribed content.

13. The electronic communication method of claim 12, wherein the processor obtained the keywords from the transcribed content database.

14. The electronic communication method of claim 13 that further comprises the step of the processor populating the gaming template with the topic.

15. The electronic communication method of claim 9, wherein the step of selecting the gaming template from the gaming template library is in response to the processor locating at least one keyword in the transcribed content that indicates a topic of the online meeting.

16. The electronic communication system of claim 9, wherein the step of the processor selecting the gaming template from the gaming template library is in response to receiving input from a host device in communication with the processor, wherein the input indicates a topic of the online meeting.

17. An electronic communication system for generating an electronic game during an online meeting presented by a meeting server, wherein the system comprises:
   a first communication device associated with a first user and in communication with the meeting server;
   a second communication device associated with second user, wherein the second communication device is in communication with the meeting server, and the first communication device and the second communication device are in communication with each other, and at least one of the first communication device and the second communication device is configured to transcribe content of the online meeting;
   a transcribed content database configured to store the transcribed content, wherein the transcribed content memory is in communication with one or both of the first communication device and the second communication device;
   an NLP configured to process the transcribed content, wherein the transcribed content is stored in a processed, transcribed content database, wherein the transcribed content database is in communication with the first communication device and the second communication device; and
   a content analyzer in communication with the transcribed content database and configured to determine one or more keywords in the processed transcribed content, wherein the one or more keywords indicate a topic of the online meeting;
   wherein at least one of the first communication device and the second communication device is further configured to (a) present the game to at least one participant device of a participant of the online meeting, and (b) receive a response to the game from the at least one participant of the online meeting via the first participant device, and to allow the at least one participant of the online meeting to move to a next objective, based on evaluating (i) the response received, and (ii) an established criterion.

18. The electronic communication system of claim 17, wherein the first communication device or the second communication device auto-transcribes content of a virtual online meeting.

19. The electronic communication system of claim 17, wherein at least one of the first communication device and the second communication device is further configured to detect a start of the topic introduced by a host of the online meeting.

20. The electronic communication system of claim 17, wherein at least one of the first communication device and the second communication device is further configured to select a gaming template from a gaming template library in response to determining a context of the online meeting by analyzing the transcribed content or the processed transcribed content.

* * * * *